(12) United States Patent
Vick, Jr.

(10) Patent No.: US 10,030,475 B2
(45) Date of Patent: Jul. 24, 2018

(54) STACKED PISTON SAFETY VALVE WITH DIFFERENT PISTON DIAMETERS

(71) Applicant: HALLIBURTON ENERGY SERVICES, INC., Houston, TX (US)

(72) Inventor: James Dan Vick, Jr., Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 464 days.

(21) Appl. No.: 14/648,944

(22) PCT Filed: Feb. 14, 2013

(86) PCT No.: PCT/US2013/026105
§ 371 (c)(1),
(2) Date: Jun. 2, 2015

(87) PCT Pub. No.: WO2014/126568
PCT Pub. Date: Aug. 21, 2014

(65) Prior Publication Data
US 2015/0369005 A1    Dec. 24, 2015

(51) Int. Cl.
*E21B 34/10* (2006.01)
*E21B 34/14* (2006.01)
(Continued)

(52) U.S. Cl.
CPC .............. *E21B 34/10* (2013.01); *E21B 23/04* (2013.01); *E21B 34/14* (2013.01); *F16K 1/32* (2013.01); *F16K 31/1225* (2013.01)

(58) Field of Classification Search
CPC .......... E21B 34/10; E21B 23/04; E21B 34/14; F16K 31/1225; F16K 1/32
See application file for complete search history.

(56) References Cited

U.S. PATENT DOCUMENTS 4,161,219 A   7/1979   Pringle
4,252,197 A   2/1981   Pringle
(Continued)

FOREIGN PATENT DOCUMENTS

EP   2206878      7/2010
WO   2015069291   5/2015

OTHER PUBLICATIONS

European Application No. 13875250.6, Extended European Search Report dated Sep. 30, 2016, 9 pages.
(Continued)

*Primary Examiner* — Brad Harcourt
(74) *Attorney, Agent, or Firm* — Kilpatrick Townsend & Stockton LLP

(57) ABSTRACT

Certain aspects are directed to a subsurface safety valve. The subsurface safety valve includes a closure mechanism and a piston assembly for actuating the closure mechanism. The piston assembly includes a first piston disposed in a first chamber, a second piston disposed in a second chamber adjacent to the first chamber, and first and second control lines. The second chamber has a second diameter that is smaller than a first diameter of the first chamber. The first control line selectively communicates pressure to the first piston in a downhole direction. The first piston applies force to the second piston in response to pressure being communicated to the first piston. The force can cause the closure mechanism to be actuated. The second control line communicates a second pressure to the first piston in an uphole direction that reduces an amount of force for displacing the second piston an uphole direction.

12 Claims, 9 Drawing Sheets

(51) Int. Cl.
*F16K 1/32* (2006.01)
*F16K 31/122* (2006.01)
*E21B 23/04* (2006.01)

(56) References Cited

U.S. PATENT DOCUMENTS

| | | |
|---|---|---|
| 4,691,779 A | 9/1987 | McMahan et al. |
| 5,560,426 A | 10/1996 | Trahan et al. |
| 6,325,148 B1 | 12/2001 | Trahan et al. |
| 7,549,480 B2 | 6/2009 | Lohbeck |
| 7,552,774 B2 | 6/2009 | Anderson et al. |
| 7,591,317 B2 | 9/2009 | Bane et al. |
| 7,661,470 B2 | 2/2010 | Doane et al. |
| 7,665,518 B2 | 2/2010 | Bane et al. |
| 7,694,742 B2 | 4/2010 | Bane et al. |
| 7,717,185 B2 | 5/2010 | Anderson et al. |
| 7,762,335 B2 | 7/2010 | Anderson et al. |
| 7,905,292 B2 | 3/2011 | Beall et al. |
| 7,938,179 B2 | 5/2011 | Bane et al. |
| 8,196,679 B2 | 6/2012 | Radford |
| 2002/0189821 A1 | 12/2002 | Watson et al. |
| 2003/0121665 A1 | 7/2003 | Trott et al. |
| 2005/0178559 A1 | 8/2005 | Jacob |
| 2006/0086509 A1 | 4/2006 | McMillan et al. |
| 2008/0066921 A1 | 3/2008 | Bane et al. |
| 2008/0078553 A1 | 4/2008 | George |
| 2008/0128137 A1 | 6/2008 | Anderson et al. |
| 2009/0008078 A1 | 1/2009 | Patel |
| 2009/0126936 A1 | 5/2009 | Begley et al. |
| 2009/0188662 A1 | 7/2009 | Casciaro et al. |
| 2009/0255692 A1 | 10/2009 | Coronado |
| 2010/0212891 A1 | 8/2010 | Stewart et al. |
| 2010/0294508 A1 | 11/2010 | Xu et al. |
| 2012/0211221 A1 | 8/2012 | Mills et al. |

OTHER PUBLICATIONS

FS Fluid Loss Isolation Barrier Valve, retrieved from the internet at http://www.halliburton.com/public/Ip/contents/Data_Sheets/web/H/H06387.pdf, Nov. 2013, 2 pages.

Depthstar® Tubing Retrievable Safety Valve, 2008, 4 pages.

NE™ Tubing-Retrievable Safety Valve, available publicly as early as 2011, 2 pages.

International Patent Application No. PCT/US2013/026105, International Search Report and Written Opinion, dated Nov. 5, 2013, 14 pages.

SP™ Tubing-Retrievable Safety Valves, available publicly as early as 2011, 2 pages.

|  | CONVENTIONAL SAFETY VALVE | STACKED PISTON SUBSURFACE SAFETY VALVE | | |
| --- | --- | --- | --- | --- |
| DEPLOYMENT DEPTH | 9,300 FEET | 9,300 FEET | 9,300 FEET | 16,200 FEET |
| OPENING PRESSURE | 13,800 PSI | 11,208 PSI | 7,846 PSI | 9,503 PSI |
| CLOSING PRESSURE | 200 PSI | 1,924 PSI | 200 PSI | 200 PSI |
| FIRST PISTON DIAMETER | 0.5815 INCH | 0.5815 INCH | 0.5815 INCH | 0.5815 INCH |
| SECOND PISTON DIAMETER | (NONE) | 0.4385 INCH | 0.4385 INCH | 0.4385 INCH |
| SPRING | STANDARD | STANDARD | LIGHT | STANDARD |
| CONTROL LINE PRESSURE | 15,000 PSI | 12,500 PSI | 9,000 PSI | 11,000 PSI |

FIG. 14

STACKED PISTON SAFETY VALVE WITH DIFFERENT PISTON DIAMETERS

CROSS-REFERENCE TO RELATED APPLICATIONS

This is a U.S. national phase under 35 U.S.C. § 371 of International Patent Application No. PCT/US2013/026105, titled "Stacked Piston Safety Valve with Different Piston Diameters" and filed Feb. 14, 2013, the entirety of which is hereby incorporated by reference herein.

TECHNICAL FIELD OF THE INVENTION

The present invention relates generally to devices for use in a wellbore in a subterranean formation and, more particularly (although not necessarily exclusively), to a stacked piston safety valve with different piston diameters for deployment in a well system.

BACKGROUND

An oil or gas well for extracting fluids such as petroleum oil hydrocarbons from a subterranean formation can include one or more subsurface safety valves for restricting fluid flow from the well. Subsurface safety valves are used to close off a well. For example, a well may be closed in the event of an uncontrolled condition to ensure the safety of surface personnel and prevent property damage and pollution.

A spring-loaded retention mechanism for closing a subsurface safety valve may exert sufficient force to overcome downhole forces exerted by fluids in the wellbore at depths thousands of feet below sea level. Increasing the deployment depth for the subsurface safety valve can require the use of springs exerting correspondingly larger forces. Hydraulic control systems for actuating the subsurface safety valve require a control line pressure sufficient to overcome the force exerted by the spring-loaded retention mechanism. Thus, increasing the depth at which the subsurface safety valve is deployed increases the amount of pressure required to open the closure mechanism.

Apparatuses and systems are desirable that can reduce the control line pressure requirements for a subsurface safety valve and increasing the depth at which the subsurface safety valve can be deployed.

SUMMARY

Certain aspects and features of the present invention are directed to a stacked piston safety valve with different piston diameters that can be disposed in a wellbore through a fluid-producing formation.

In one aspect, a piston assembly is provided that can be disposed in a wellbore through a fluid-producing formation. The piston assembly includes a first piston disposed in a first chamber, a second piston disposed in a second chamber adjacent to the first chamber, a first control line, and a second control line. The first chamber has a first diameter and the second chamber has a second diameter that is smaller than the first diameter. The first control line can selectively communicate a first pressure to the first piston in a downhole direction. The first piston is configured to apply a force to the second piston in response to the first pressure being communicated to the first piston. The second control line can communicate a second pressure to the first piston in an uphole direction. The second pressure can reduce an amount of force for displacing the second piston an uphole direction.

In another aspect, a subsurface safety valve is provided that can be disposed in a wellbore through a fluid-producing formation. The subsurface safety valve includes a closure mechanism and a piston assembly. The closure mechanism can be positioned in a passageway defined by a tubing string. The closure mechanism selectively prevents a flow of fluid to a portion of the passageway that is closer to a surface of the wellbore than the closure mechanism. The piston assembly includes a first piston disposed in a first chamber, a second piston disposed in a second chamber adjacent to the first chamber, a first control line, and a second control line. The first chamber has a first diameter and the second chamber has a second diameter that is smaller than the first diameter. The first control line can selectively communicate a first pressure to the first piston in a downhole direction. The first piston is configured to apply a force to the second piston in response to the first pressure being communicated to the first piston. The force is adapted to cause the closure mechanism to be actuated. The second control line can communicate a second pressure to the first piston in an uphole direction. The second pressure can reduce an amount of force for displacing the second piston an uphole direction.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE DRAWINGS

FIG. 14 is a table including examples of operating pressures and deployment depths for a subsurface safety valve having different piston sizes according to one aspect of the present invention.

DETAILED DESCRIPTION

Figure 1:
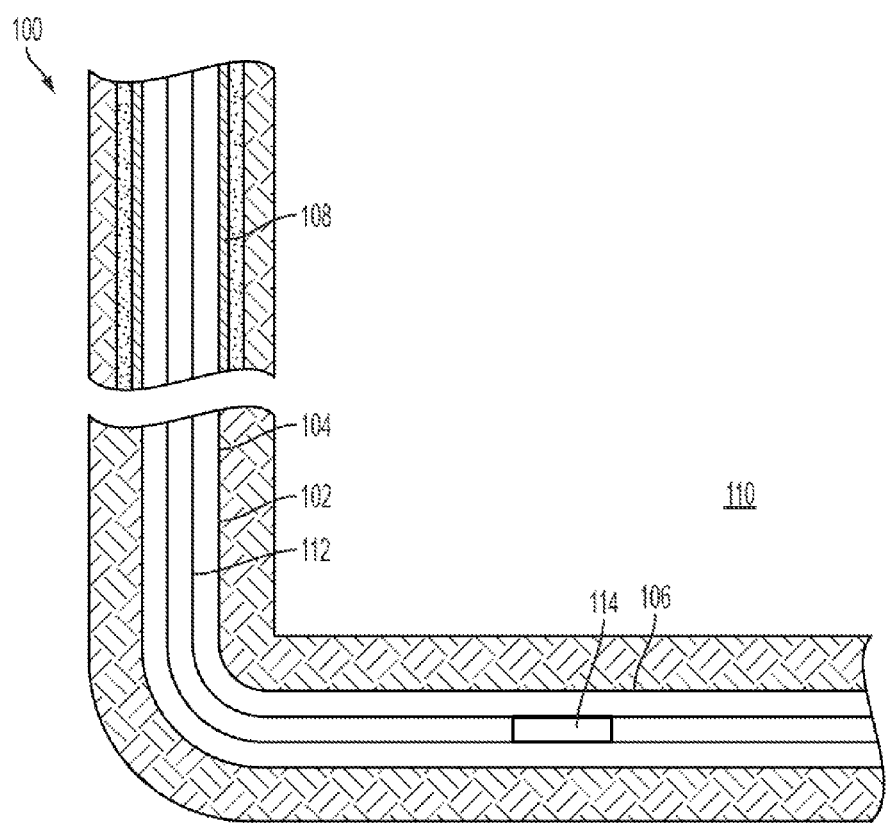
FIG. 1 is a schematic illustration of a well system having a stacked piston safety valve according to one aspect of the present invention.

Certain aspects and examples of the present invention are directed to a stacked piston safety valve with different piston diameters that can be disposed in a wellbore through a fluid-producing formation.

In accordance with some aspects, a subsurface safety valve is provided that can be disposed in a wellbore through a fluid-producing formation. The subsurface safety valve includes a closure mechanism and a piston assembly that is configured to actuate the closure mechanism. The closure mechanism can include any device that can selectively prevent or otherwise restrict fluid flow in a well system. A non-limiting example of a closure mechanism is a flapper valve. The piston assembly includes a first piston disposed in a first chamber, a second piston disposed in a second chamber, a first control line, and a second control line. The first chamber has a first diameter and the second chamber has a second diameter that is smaller than the first diameter. The first control line can selectively communicate a first pressure to the first piston in a downhole direction, thereby causing the first piston to apply a force to the second piston. The force applied to the second piston can cause the closure mechanism to be actuated. For example, the second piston can apply an additional force to a flow tube that is adapted to open the closure mechanism. The second control line can communicate a second pressure to the first piston in an uphole direction. The second pressure communicated to the first piston in an uphole direction can reduce the amount of force used to close the closure mechanism. For example, communicating the second pressure to the first piston can reduce or eliminate a pressure differential across the first piston. Reducing or eliminating the pressure differential across the first piston can allow the piston assembly to be shifted in an uphole direction by a force sufficient to displace the smaller piston alone.

A stacked piston safety valve with different piston diameters can allow for the use of safety valves having weaker springs in spring-loaded flow tubes. The use of differently sized pistons can also provide multiple barriers for preventing gas migration into the control line. In some aspects, the stacked piston safety valve with different piston diameters can be operated as a redundant operator safety valve with different parameters for different systems.

The difference in piston size can allow a safety valve to be deployed at greater depths than conventional safety valves. For example, the deployment depth can be increased from 9300 feet for a conventional safety valve to 16,200 feet for a stacked piston safety valve with different piston diameters. The difference in piston size can also lower the control line pressure used for a deep-set safety valve. For example, control line pressure can be reduced from 15,000 pounds per square inch ("psi") for a conventional safety valve to 9,000 psi for a stacked piston safety valve with different piston diameters. The difference in piston size can also reduce the control line pressure used for a shallow set safety valve. For example, control line pressure can be reduced from 12,500 psi for a conventional safety valve to 8,500 psi for a stacked piston safety valve with different piston diameters.

The stacked piston safety valve with different piston diameters can be used in well systems with conventional safety valves. For example, using a conventional safety valve on a shallow well and a stacked piston safety valve with different piston diameters on a deep-set well can reduce the control line pressure requirements for the entire well system to less than 12,500 psi. As used herein, the term "conventional safety valve" can include safety valves actuated by a single piston and/or safety valves actuated by multiple pistons having the same diameter.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples. The following sections use directional descriptions such as "above," "below," "upper," "lower," "upward," "downward," "left," "right," "uphole," "downhole," etc. in relation to the illustrative examples as they are depicted in the figures, the upward direction being toward the top of the corresponding figure and the downward direction being toward the bottom of the corresponding figure, the uphole direction being toward the surface of the well and the downhole direction being toward the toe of the well. Like the illustrative examples, the numerals and directional descriptions included in the following sections should not be used to limit the present invention.

FIG. 1 schematically depicts a well system 100 with a subsurface safety valve that can be used with a semi-autonomous insert valve. The well system 100 includes a wellbore 102 extending through various earth strata. The wellbore 102 has a substantially vertical section 104. The substantially vertical section 104 may include a casing string 108 cemented at an upper portion of the substantially vertical section 104. The substantially vertical section 104 extends through a hydrocarbon-bearing subterranean formation 110.

A tubing string 112 extends from the surface within wellbore 102. The tubing string 112 can define a passageway providing a conduit for production of formation fluids to the surface.

The subsurface safety valve 114 is positioned within a passageway defined by the tubing string 112. The subsurface safety valve 114 is depicted as functional block in FIG. 1. Pressure from the subterranean formation 110 can cause fluids to flow from the subterranean formation 110 to the surface. The subsurface safety valve 114 can include equipment capable of restricting or preventing the production of formation fluids.

Although FIG. 1 depicts the subsurface safety valve 114 positioned in the substantially horizontal section 106, a subsurface safety valve 114 can be located, additionally or alternatively, in the substantially vertical section 104. In some aspects, subsurface safety valves can be disposed in wellbores having both a substantially vertical section and a substantially horizontal section. A subsurface safety valves 114 can be disposed in open hole environments, such as is depicted in FIG. 1, or in cased wells.

Figure 2:
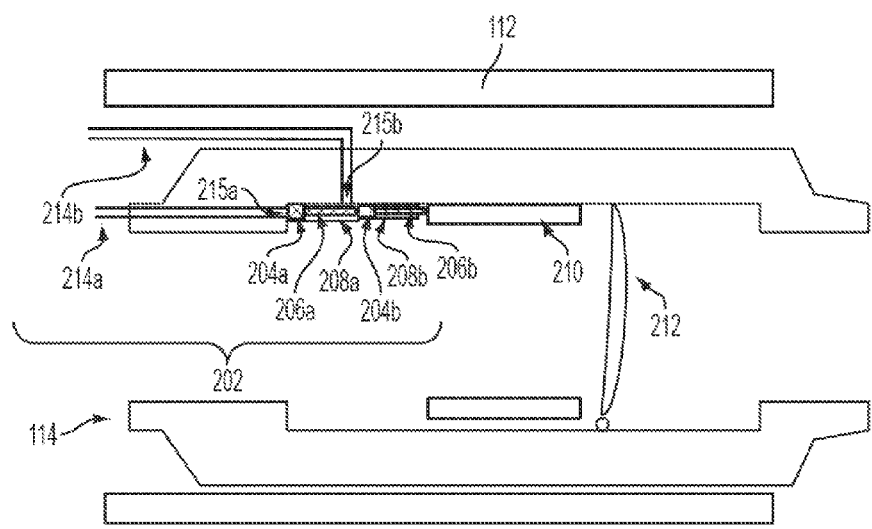
FIG. 2 is a cross-sectional side view of a stacked piston safety valve with multiple pistons having different diameters according to one aspect of the present invention.
Figure 3:
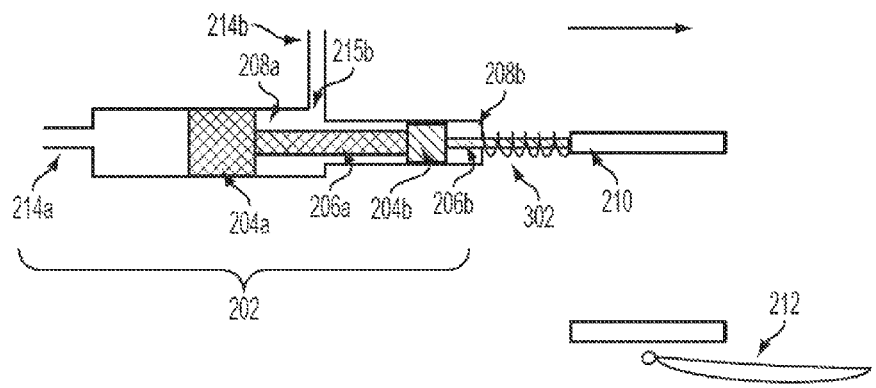
FIG. 3 is a cross-sectional side view of opening the stacked piston safety valve with multiple pistons of different diameters according to one aspect of the present invention.
Figure 4:
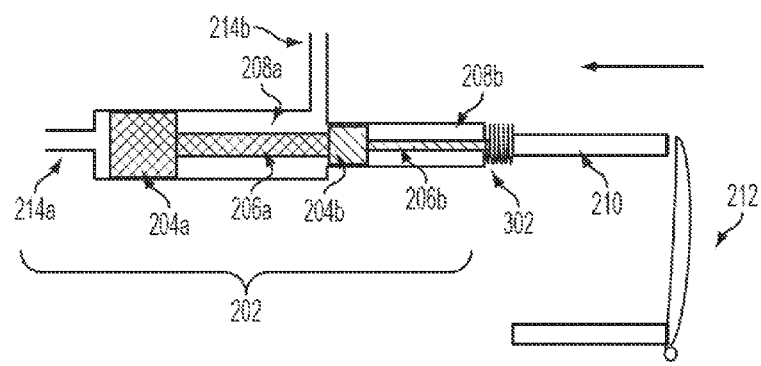
FIG. 4 is a cross-sectional side view of closing the stacked piston safety valve with multiple pistons of different diameters according to one aspect of the present invention.

FIGS. 2-4 depict cross-sectional side views of a stacked piston subsurface safety valve 114 with pistons 204a, 204b that have different diameters relative to each other.

The subsurface safety valve 114 can include a closure mechanism 212 and a piston assembly 202 for actuating the closure mechanism 212. The piston assembly 202 includes pistons 204a, 204b, rods 206a, 206b, and control lines 214a, 214b.

The closure mechanism 212 can be any suitable mechanism for preventing or otherwise restricting the flow of fluid toward the surface of the wellbore 102. Selecting an open or closed position of the closure mechanism 212 can prevent or otherwise restrict the flow of fluids from the subterranean formation 110 toward the surface of the well system 100. A non-limiting example of a closure mechanism 212 is a flapper valve, as depicted in FIGS. 2-4. A flapper valve can include a spring-loaded plate that is pivotally mounted to rotate between an open and a closed position. Other non-limiting examples of closure mechanisms include (but are not limited to) a ball valve or a poppet valve. A ball valve can include a spherical disc having a port through the middle such that fluids can flow through the ball valve when the port is aligned with both ends of the ball valve. The ball valve can be closed to block the flow of fluids by orienting spherical disc such that the port is perpendicular to the ends of the ball valve. A poppet valve can include a hole and a tapered plug portion, such as a disk shape on the end of a shaft. The shaft guides the plug portion by sliding through a valve guide. A pressure differential can seal the poppet valve.

The closure mechanism 212 can be actuated by applying force to a flow tube 210 using the piston assembly 202. The piston 204a can be positioned adjacent to the rod 206a. The piston 204a and the rod 206a can be disposed in a chamber 208a. The piston 204b can be positioned adjacent to the rod 206b. The piston 204b and the rod 206b can be disposed in a chamber 208b. A diameter of the piston 204b can be smaller than a diameter of the piston 204a. The diameter of the chamber 208b can be smaller than the diameter of the chamber 208a.

The piston assembly 202 can be shifted in an uphole direction or a downhole direction to actuate the closure mechanism 212. The pistons 204a, 204b and the rods 206a, 206b can be displaced in a downhole direction to open the subsurface safety valve 114. The downhole direction can be a direction from the surface of the well system 100 toward the opposite end of the well system 100 and/or the formation 110. As depicted in FIGS. 2-4, a downhole direction can correspond to a direction toward the right-hand side of the subsurface safety valve 114. The pistons 204a, 204b and the rods 206a, 206b can be displaced in an uphole direction to close the subsurface safety valve 114. The uphole direction can be a direction from the formation 110 toward the opposite end of the well system 100 and/or the surface of the well system 100. As depicted in FIGS. 2-4, an uphole direction can correspond to a direction toward the left-hand side of the subsurface safety valve 114.

The pistons 204a, 204b and the rods 206a, 206b can be simultaneously displaced during actuation of the subsurface safety valve 114. The diameter of the piston 204b being smaller than the diameter of the piston 204a can reduce the amount of force for displacing the piston assembly 202 in an uphole direction.

A control line 214a can communicate pressure to the piston 204a to the chamber 208a in a downhole direction via an inlet 215a. A non-limiting example of a source of the pressure communicated by the control line 214a is a hydraulic control system. The control system can be located at any suitable position in the well system 100 such as (but not limited to) a rig at the surface of the wellbore 102. The pressure communicated via the control line 214a can apply a force to the piston assembly 202 in a downhole direction. The force applied to the piston assembly 202 can shift the piston assembly 202 in a downhole direction, as depicted by the rightward arrow in FIG. 3. The displacement of the piston assembly 202 can cause the piston 204b to apply force to the flow tube 210. The force applied to the flow tube 210 can cause the flow tube 210 to apply force to the closure mechanism 212, thereby opening the subsurface safety valve 114.

The closure mechanism 212 can be set to a closed position by ceasing to communicate pressure via control line 214a. As depicted in FIGS. 3-4, the flow tube 210 can include a spring-loaded retention mechanism 302 for retracting the flow tube 210 in the absence of pressure being communicated from the control line 214a. The spring-loaded retention mechanism 302 can be configured to exert a force in an uphole direction. The force exerted in the uphole direction can oppose a force applied by the piston assembly 202 in a downhole direction. A non-limiting example of a spring-loaded retention mechanism 302 can include an expansion spring coupled to the flow tube 210.

To close the subsurface safety valve 114, the force exerted by the spring-loaded retention mechanism 302 in the uphole direction can overcome a force exerted by the piston 204b. The force exerted by the spring-loaded retention mechanism 302 can cause the flow tube 210 to shift in an uphole direction by overcoming the force exerted by the piston 204b, as depicted by the leftward arrow in FIG. 4. The flow tube 210 shifting in an uphole direction can cause a cessation of force being applied to the closure mechanism 212, thereby allowing the subsurface safety valve 114 to close.

A control line 214b can be used to decrease the amount of force used by the spring-loaded retention mechanism to shift the flow tube 210 in an uphole direction. The control line 214b can communicate pressure from any suitable pressure source to the piston 204a in an uphole direction via the inlet 215b to the chamber 208a. In some aspects, the control line 214b can communicate pressure from an annulus between the subsurface safety valve 114 and the tubing string 112. In other aspects, the control line 214b can communicate pressure from another pressure source in the well system 100, such as the ocean floor. In other aspects, the control line 214b can communicate pressure from a hydraulic control system in the well system 100 different from the hydraulic control system that provides a pressure source for the control line 214a.

The absence of pressure communicated from the control line 214a in a downhole direction and the communication of pressure by the control line 214b can cause equal or substantially equal pressure to be communicated to the piston 204a in an uphole direction and a downhole direction. The balancing of pressure across the piston 204a can minimize or eliminate a pressure differential across the piston 204a. Minimizing or eliminating the pressure differential across the piston 204a can reduce the amount of force required by the spring-loaded retention mechanism 302 shift the flow tube 210 in an uphole direction. For example, the force required to shift the flow tube 210 in an uphole direction may be equal to an amount of force required to move the piston 204b and to overcome the pressure differential across the piston 204a. The smaller diameter of the piston 204b with respect to the piston 204a can reduce the amount of force required moving the piston 204b in an uphole direction.

Figure 5:
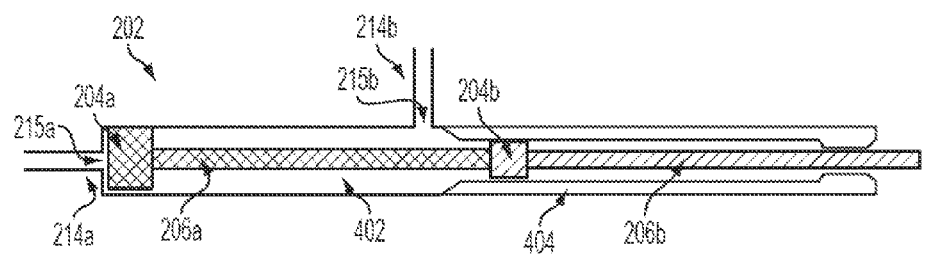
FIG. 5 is a cross-sectional side view of a piston assembly with multiple pistons of different diameters that is positioned in a chamber having a sleeve according to one aspect of the present invention.
Figure 6:
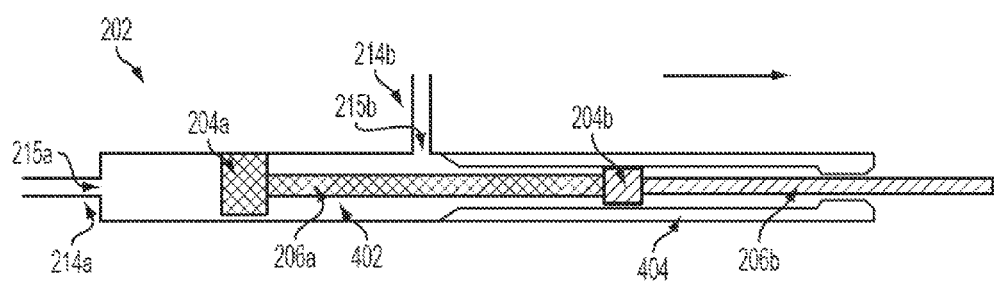
FIG. 6 is a cross-sectional side view the piston assembly positioned in the chamber having the sleeve and being actuated in a downhole direction according to one aspect of the present invention.
Figure 7:
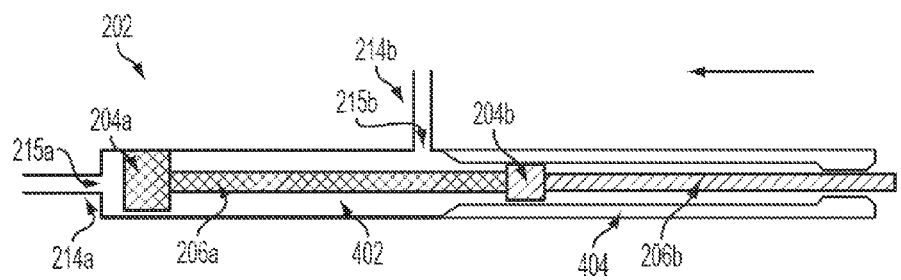
FIG. 7 is a cross-sectional side view of the piston assembly positioned in the chamber having the sleeve and being actuated in an uphole direction according to one aspect of the present invention.

Although FIGS. 2-4 depict a chamber 208b that is formed with a smaller diameter than the chamber 208a, other implementation are possible. For example, FIGS. 5-7 depict a sleeve 404 that can be positioned within a chamber 402 to accommodate the smaller diameter of the piston 204b. The sleeve 404 can be formed from any suitable rigid material, such as metal. As described above with respect to FIGS. 2-4, pressure can be communicated via the control line 214a to shift the pistons 204a, 204b and rods 206a, 206b in a downhole direction. The downhole movement of the pistons 204a, 204b and rods 206a, 206b is depicted by the rightward arrow in FIG. 6. Pressure can subsequently cease being communicated via the control line 214a. As described above with respect to FIGS. 2-4, a spring-loaded retention mechanism can shift the pistons 204a, 204b and rods 206a, 206b in an uphole direction. The uphole movement of the pistons 204a, 204b and rods 206a, 206b is depicted by the leftward arrow in FIG. 7.

Although FIGS. 2-7 depict the pistons 204a, 204b and the rods 206a, 206b being displaced as a unit without being coupled to one another, other implementations are possible.

Figure 8:
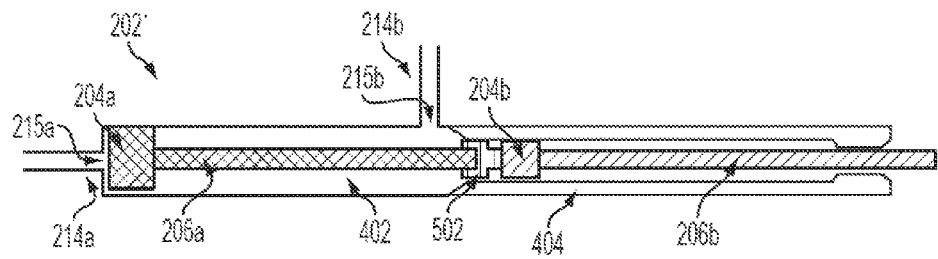
FIG. 8 is a cross-sectional side view of a piston assembly with multiple pistons of different diameters and connected via a connector according to one aspect of the present invention.
Figure 9:
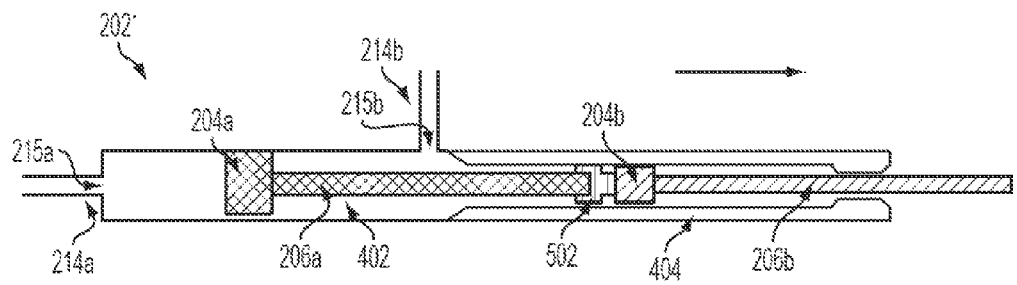
FIG. 9 is a cross-sectional side view of actuating the piston assembly with multiple pistons of different diameters and connected via the connector in a downhole direction according to one aspect of the present invention.
Figure 10:
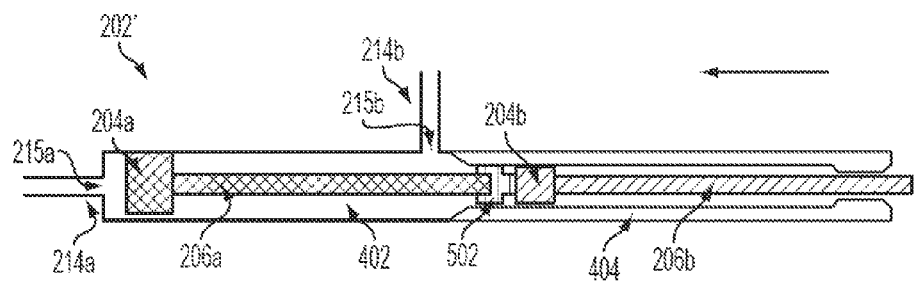
FIG. 10 is a cross-sectional side view of actuating the piston assembly with multiple pistons of different diameters and connected via the connector in an uphole direction according to one aspect of the present invention.

In additional or alternative aspects, one or more of the pistons 204a, 204b and the rods 206a, 206b can be coupled to one another, as depicted in the piston assembly 202' of FIGS. 8-10. FIG. 8 depicts a piston assembly 202' that includes the pistons 204a, 204b, the rods 206a, 206b, the control lines 214a, 214b, and a connector 502. The piston 204a can be attached to the rod 206a by any suitable mechanism, such as welding. The piston 204b can be coupled to the rod 206a via the connector 502. The piston 204b can be attached to the rod 206b by any suitable mechanism, such as welding.

As described above with respect to FIGS. 2-4, pressure can be communicated via the control line 214a to shift the pistons 204a, 204b and rods 206a, 206b in a downhole direction. The downhole movement of the pistons 204a, 204b and rods 206a, 206b is depicted by the rightward arrow in FIG. 9. Pressure can subsequently cease being communicated via the control line 214a. As described above with respect to FIGS. 2-4, a spring-loaded retention mechanism can shift the pistons 204a, 204b and rods 206a, 206b in an uphole direction. The uphole movement of the pistons 204a, 204b and rods 206a, 206b is depicted by the leftward arrow in FIG. 10.

Figure 11:
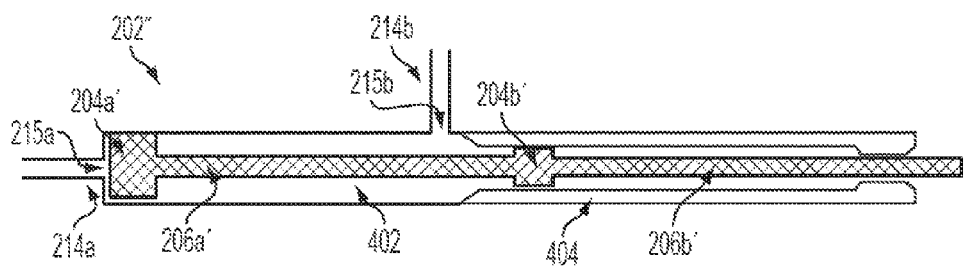
FIG. 11 is a cross-sectional side view of a piston assembly with multiple, integral pistons of different diameters according to one aspect of the present invention.
Figure 12:
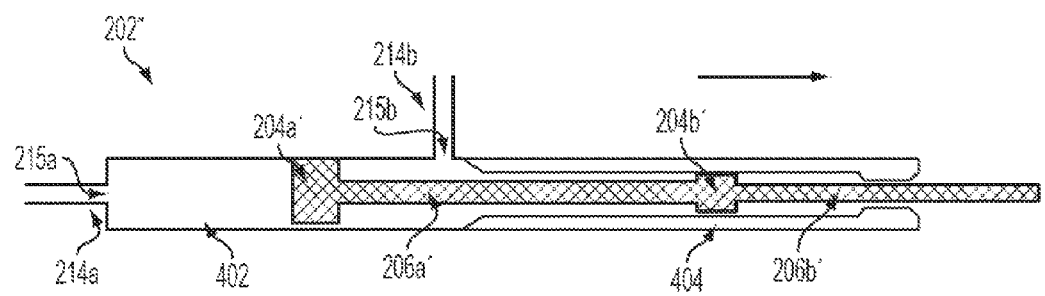
FIG. 12 is a cross-sectional side view of actuating the piston assembly with multiple, integral pistons of different diameters in a downhole direction according to one aspect of the present invention.
Figure 13:
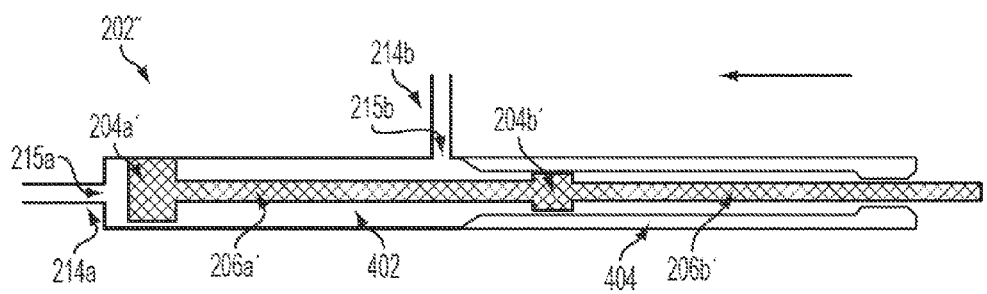
FIG. 13 is a cross-sectional side view of actuating the piston assembly with multiple, integral pistons of different diameters in an uphole direction according to one aspect of the present invention.

In additional or alternative aspects, one or more of the pistons 204a, 204b and the rods 206a, 206b can be integral with one another, as depicted in the piston assembly 202" of FIGS. 11-13. FIG. 11 depicts a piston assembly 202" that includes the pistons 204a', 204b', the rods 206a', 206b', and the control lines 214a, 214b. The pistons 204a', 204b' and the rods 206a', 206b' can be formed such that each of the pistons 204a', 204b' and the rods 206a', 206b' are integral with one another. As described above with respect to FIGS. 2-4, pressure can be communicated via the control line 214a to shift the pistons 204a', 204b' and rods 206a', 206b' in a downhole direction. The downhole movement of the pistons 204a', 204b' and rods 206a', 206b' is depicted by the rightward arrow in FIG. 12. Pressure can subsequently cease being communicated via the control line 214a. As described above with respect to FIGS. 2-4, a spring-loaded retention mechanism can shift the pistons 204a', 204b' and rods 206a', 206b' in an uphole direction. The uphole movement of the pistons 204a', 204b' and rods 206a', 206b' is depicted by the leftward arrow in FIG. 13.

Non-limiting examples of operating pressures for a subsurface safety valve 114 having different piston sizes are provided in the table depicted in FIG. 14. In one non-limiting example, the subsurface safety valve 114 can be deployed at a depth of 9,300 feet and can have a flow tube 210 using a standard spring. In another non-limiting example, the subsurface safety valve 114 can be deployed at a depth of 9,300 feet and can have a flow tube 210 using a light spring. A light spring can be configured to exert a smaller force than a standard spring. In another non-limiting example, the subsurface safety valve 114 can be deployed at a depth of 16,200 feet and can have a flow tube 210 using a standard spring.

A non-limiting example of a conventional safety valve can include a safety valve with a single piston having a diameter of 0.5815 inches. The conventional safety valve can be deployed at a depth of 9,300 feet. At a depth of 9,300 feet, the conventional safety valve may have an opening pressure of 13,800 psi to set a closure mechanism of the safety valve to an open position. A hydraulic control system can provide a control line pressure of up to 15,000 psi for opening the conventional safety valve. The conventional safety valve can have a closing pressure of 200 psi.

As depicted in FIG. 14, an example subsurface safety valve 114 deployed at a depth of 9,300 feet and having a flow tube 210 using a standard spring can reduce the control line pressure as compared to the conventional safety valve. The piston 204a of the example subsurface safety valve 114 can have a diameter of 0.5815 inches. The piston 204b of the example subsurface safety valve 114 can have a diameter of 0.4385 inches. The opening pressure can be reduced to 11,208 psi. The reduction in the opening pressure can allow for the use of a control line 214a configured to provide a control line pressure of 12,500 psi.

As depicted in FIG. 14, an example subsurface safety valve 114 deployed at a depth of 9,300 feet and having a flow tube 210 using a light spring can further reduce the control line pressure as compared to the conventional safety valve. The piston 204a of the example subsurface safety valve 114 can have a diameter of 0.5815 inches. The piston 204b of the example subsurface safety valve 114 can have a diameter of 0.4385 inches. The opening pressure can be reduced to 7,846 psi due to the reduced uphole force exerted by the light spring as compared to a standard spring. The reduction in the opening pressure can allow for the use of a control line 214a configured to provide a control line pressure of 9,000 psi.

As depicted in FIG. 14, an example subsurface safety valve 114 having a flow tube 210 using a standard spring can be deployed at a greater depth than a conventional safety valve and can reduce the control line pressure as compared to the conventional safety valve. The piston 204a of the example subsurface safety valve 114 can have a diameter of 0.5815 inches. The piston 204b of the example subsurface safety valve 114 can have a diameter of 0.4385 inches. A reduction in the opening pressure due to the use of multiple pistons having different diameters can allow the example subsurface safety valve 114 to be deployed to a depth of 16,200 feet. The reduction in the opening pressure can allow for the use of a control line 214a configured to provide a control line pressure of 11,000 psi.

Although the piston assembly 202 is described above as an actuation mechanism for a subsurface safety valve, other implementations are possible. In additional or alternative aspects, a piston assembly 202 can be disposed in any device or system to actuate a device or a component of a device by applying pressure via the pistons 204a, 204b.

Figure 15:
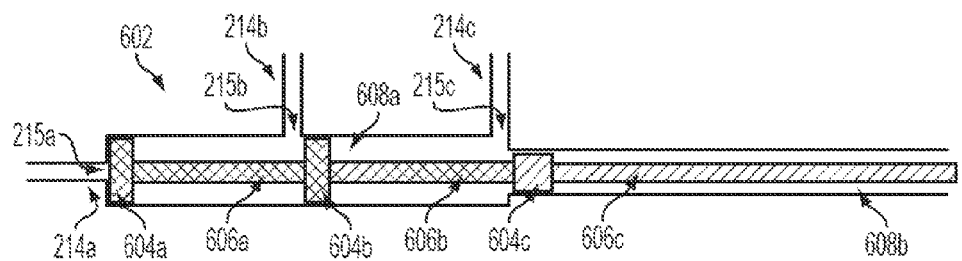
FIG. 15 is a cross-sectional side view of a stacked piston safety valve with two pistons having a same diameter and a third piston having a different diameter according to one aspect of the present invention.
Figure 16:
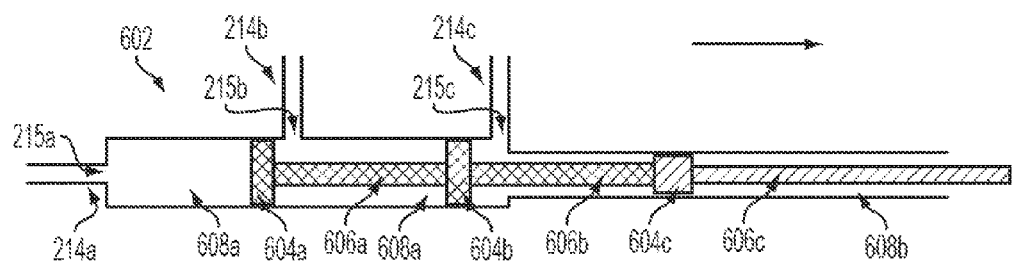
FIG. 16 is a cross-sectional side view of opening the stacked piston safety valve with two pistons having a same diameter and a third piston having a different diameter according to one aspect of the present invention.
Figure 17:
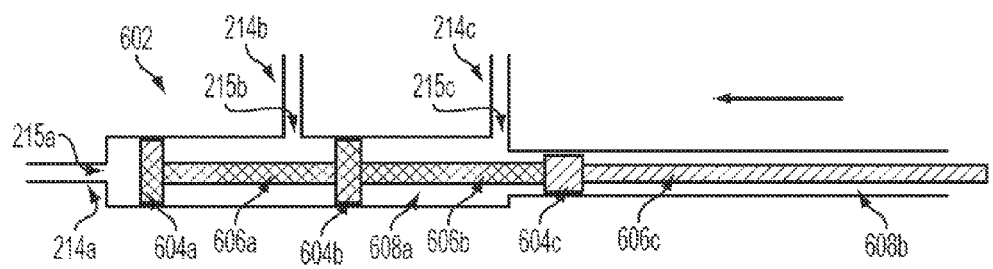
FIG. 17 is a cross-sectional side view of closing the stacked piston safety valve with two pistons having a same diameter and a third piston having a different diameter according to one aspect of the present invention.

Although a stacked piston assembly has been described above as having two pistons, other implementations are possible. In some aspects, a stacked piston assembly can include two pistons of a first size and a third piston of a smaller size, as depicted in FIGS. 15-17. FIG. 15 depicts a piston assembly 602 that includes the pistons 604a-c, the rods 606a-c, and the control lines 214a-c respectively communicating pressure via inlets 215a-c. The piston 604a can be positioned adjacent to the rod 606a. The piston 604a and the rod 606a can be disposed in a chamber 608a. The piston 604b can be positioned adjacent to the rod 606b. The piston 604b and the rod 606b can be disposed in a chamber 608a. A diameter of the piston 604b can be the same as a diameter of the piston 604a. The control line 214c can communicate pressure from any suitable pressure source to the piston 604b in an uphole direction via the inlet 215c to the chamber 208a. The piston 604c and the rod 606c can be disposed in a chamber 608b adjacent to the chamber 608a. A diameter of the piston 604c can be smaller than a diameter of the pistons 604a, 604b. The diameter of the chamber 608b can be smaller than the diameter of the chamber 608a.

As described above with respect to FIGS. 2-4, pressure can be communicated via the control line 214a to shift the pistons 604a-c and rods 606a-c in a downhole direction. The downhole movement of the pistons 604a-c and rods 606a-c is depicted by the rightward arrow in FIG. 16. Pressure can subsequently cease being communicated via the control line 214a. As described above with respect to FIGS. 2-4, a spring-loaded retention mechanism can shift the pistons 604-c and rods 606a-c in an uphole direction. The uphole movement of the pistons 604-c and rods 606a-c is depicted by the leftward arrow in FIG. 17.

Figure 18:
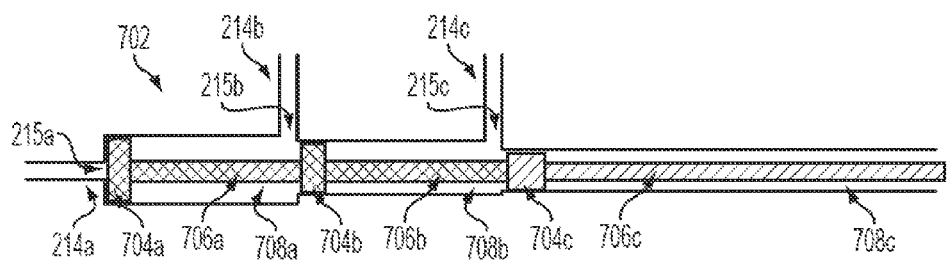
FIG. 18 is a cross-sectional side view of a stacked piston safety valve with three pistons each having different diameters according to one aspect of the present invention.
Figure 19:
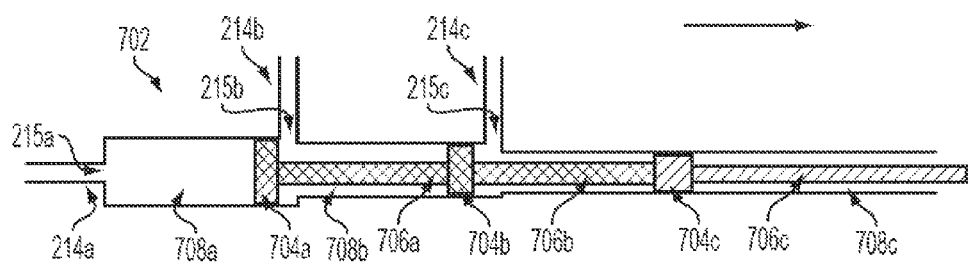
FIG. 19 is a cross-sectional side view of opening the stacked piston safety valve with three pistons each having different diameters according to one aspect of the present invention.
Figure 20:
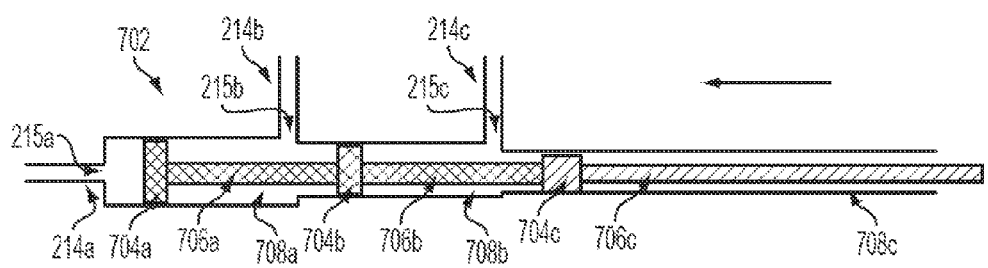
FIG. 20 is a cross-sectional side view of closing the stacked piston safety valve with three pistons each having different diameters according to one aspect of the present invention.

In other aspects, a stacked piston assembly can include three pistons of different sizes, as depicted in FIGS. 18-20. FIG. 18 depicts a piston assembly 702 that includes the pistons 704a-c, the rods 706a-c, and the control lines 214a-c respectively communicating pressure via inlets 215a-c. The piston 704a can be positioned adjacent to the rod 706a. The piston 704a and the rod 706a can be disposed in a chamber 708a. The control line 214b can communicate pressure from any suitable pressure source to the piston 704a in an uphole direction via the inlet 215b to the chamber 708a. The piston 704b can be positioned adjacent to the rod 706b. The piston 704b and the rod 706b can be disposed in a chamber 708b. A diameter of the piston 704b can smaller than a diameter of the piston 704a. The diameter of the chamber 708b can be smaller than the diameter of the chamber 708a. The control line 214c can communicate pressure from any suitable pressure source to the piston 704b in an uphole direction via the inlet 215c to the chamber 708b. The piston 704c and the rod 706c can be disposed in a chamber 708c adjacent to the chamber 708a. A diameter of the piston 704c can be smaller than a diameter of the pistons 704a, 704b. The diameter of the chamber 708c can be smaller than the diameter of the chamber 708b.

As described above with respect to FIGS. 2-4, pressure can be communicated via the control line 214a to shift the pistons 704a-c and rods 706a-c in a downhole direction. The downhole movement of the pistons 704a-c and rods 706a-c is depicted by the rightward arrow in FIG. 19. Pressure can subsequently cease being communicated via the control line 214a. As described above with respect to FIGS. 2-4, a spring-loaded retention mechanism can shift the pistons 704-c and rods 706a-c in an uphole direction. The uphole movement of the pistons 704-c and rods 706a-c is depicted by the leftward arrow in FIG. 20.

The foregoing description of the invention, including illustrated examples and aspects, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A piston assembly configured for being disposed in a wellbore through a fluid-producing formation, the piston assembly comprising:
   a first piston disposed in a first chamber having a first diameter;
   a second piston disposed in a second chamber adjacent to the first chamber and having a second diameter, wherein the second diameter is smaller than the first diameter; and
   a first control line configured to selectively communicate a first pressure from a first control system to the first piston in a downhole direction, wherein the first piston is configured to apply a force to the second piston in response to the first pressure being communicated to the first piston; and
   a second control line configured to communicate a second pressure from a second control system or from an annulus between the wellbore and a tubing string to the first piston in an uphole direction, the second pressure adapted to reduce an amount of force for displacing the second piston an uphole direction.

2. The piston assembly of claim 1, wherein the second piston is configured to contact a flow tube of a closure mechanism and to apply a force to the flow tube to actuate the closure mechanism.

3. The piston assembly of claim 1, wherein the second control line is configured to communicate the second pressure such that a pressure differential across the first piston is minimized in response to a cessation of the first pressure being communicated by the first control line.

4. The piston assembly of claim 1, wherein the second control line is coupled to the first chamber via an inlet positioned closer to the surface of the wellbore than the second chamber.

5. The piston assembly of claim 1, wherein the control system is at the surface of the wellbore.

6. The piston assembly of claim 1, wherein the second chamber comprises a rigid sleeve disposed in the first chamber.

7. A subsurface safety valve configured for being disposed in a wellbore through a fluid-producing formation,
- a closure mechanism configured to be positioned in a passageway defined by a tubing string, wherein the closure mechanism is configured to selectively prevent a flow of fluid to a portion of the passageway that is closer to a surface of the wellbore than the closure mechanism; and
- a piston assembly configured for actuating the closure mechanism, the piston assembly comprising:
    - a first piston disposed in a first chamber having a first diameter;
    - a second piston disposed in a second chamber adjacent to the first chamber and having a second diameter, wherein the second diameter is smaller than the first diameter; and
    - a first control line configured to selectively communicate a first pressure from a first control system to the first piston in a downhole direction, wherein the first piston is configured to apply a force to the second piston in response to the first pressure being communicated to the first piston, the force adapted to cause the closure mechanism to be actuated; and
    - a second control line configured to communicate a second pressure from a second control system or from an annulus between the wellbore and a tubing string to the first piston in an uphole direction, the second pressure adapted to reduce an amount of force for displacing the second piston an uphole direction.

8. The subsurface safety valve of claim 7,
further comprising a flow tube adjacent to the closure mechanism, the flow tube configured to be positioned in the passageway defined by the tubing string;
wherein the second piston is configured to contact the flow tube and to apply a force to the flow tube,
wherein the flow tube is configured to open the closure mechanism in response to the force being applied to the flow tube.

9. The subsurface safety valve of claim 8,
wherein the second control line is configured to communicate the second pressure such that a pressure differential across the first piston is minimized in response to a cessation of the first pressure being communicated by the first control line;
wherein the flow tube comprises a spring-loaded retention mechanism, the spring-loaded retention mechanism configured to exert an uphole force in an uphole direction against the second piston, wherein the uphole force exceeds a downhole force exerted by the second piston and the minimized pressure differential.

10. The subsurface safety valve of claim 7, wherein the second control line is coupled to the first chamber via an inlet positioned closer to the surface of the wellbore than the second chamber.

11. The subsurface safety valve of claim 7, wherein the first pressure source comprises a control system at the surface of the wellbore.

12. The subsurface safety valve of claim 7, wherein the second chamber of the piston assembly comprises a rigid sleeve disposed in the first chamber of the piston assembly.

* * * * *